United States Patent [19]

Arisaka

[11] Patent Number: 5,495,465
[45] Date of Patent: Feb. 27, 1996

[54] SPINDLE CONTROL CIRCUIT OF OPTICAL DISK DRIVE

[75] Inventor: Akihiro Arisaka, Hachiouji, Japan

[73] Assignee: Kabushiki Kaisha Kenwood, Tokyo, Japan

[21] Appl. No.: 328,720

[22] Filed: Oct. 25, 1994

[30] Foreign Application Priority Data

Oct. 29, 1993 [JP] Japan .................. 5-294253

[51] Int. Cl.$^6$ ...................................... G11B 7/00
[52] U.S. Cl. .................. 369/124; 369/32; 369/47; 358/340
[58] Field of Search ................ 369/30, 32, 47, 369/50, 59, 124; 358/340, 342

[56] References Cited

U.S. PATENT DOCUMENTS 5,065,253 11/1991 Ishii ........................................ 358/340
5,163,035 11/1992 Horikiri .................................... 369/47

FOREIGN PATENT DOCUMENTS 0344994 12/1989 European Pat. Off. .
57-064370 4/1982 Japan .
4318329 11/1992 Japan .

*Primary Examiner*—Loha Ben
*Attorney, Agent, or Firm*—Sixbey, Friedman, Leedom & Ferguson; Gerald J. Ferguson, Jr.

[57] ABSTRACT

A spindle control circuit of an optical disk drive capable of performing a high precision and high stability spindle control by preventing an off-control even if the rotation speed is shifted from a predetermined linear velocity such as when a spindle starts rotating or during a search. First and second band-pass filters are provided having a narrow band and a broad band, with the center frequency of the band being set to the center frequency of a wobble signal picked up from an optical disk, An output of the second band-pass is selectively outputted until lock state is detected, and an output of the first band-pass filter is selectively outputted after the lock state is detected. A linear velocity control is performed in accordance with a selected output of the first and second band-pass filters.

1 Claim, 3 Drawing Sheets

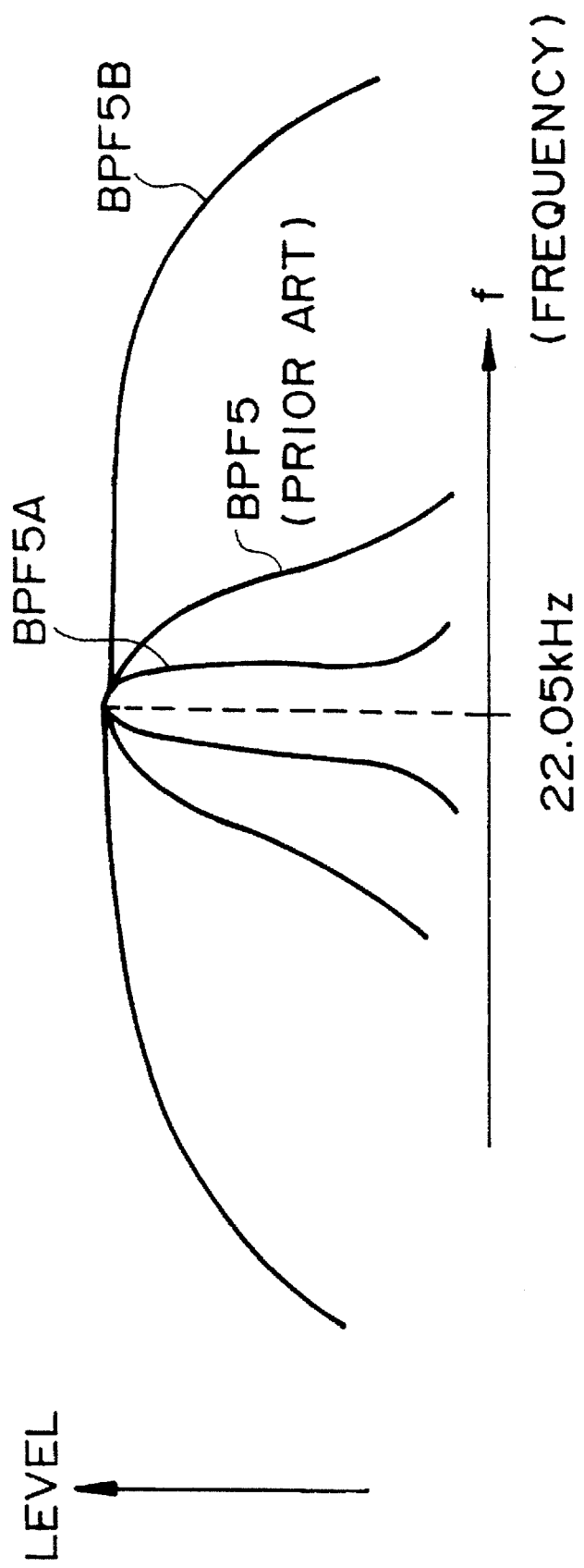
F I G. 2

SPINDLE CONTROL CIRCUIT OF OPTICAL DISK DRIVE

BACKGROUND OF THE INVENTION

1. Field of the Invention

The present invention relates to a spindle control circuit of an optical disk drive, and more particularly to a spindle control circuit of an optical disk drive for performing a constant linear velocity (CLV) control in accordance with a wobble signal.

2. Related Background Art

In a conventional optical disk drive, a spindle control for controlling the rotation of a spindle motor so as to maintain the rotation of an optical disk at a constant linear velocity is performed in accordance with a wobble signal picked up from the optical disk. An optical disk is recorded with an FM modulated signal having a carrier frequency of 22.05 kHz and a frequency deviation of ±1 kHz, as data of 3150 bit/s at a bi-phase clock of 6.3 kHz. A wobble signal can be detected from a rotating disk as a tracking push-pull error. Center frequency components of the wobble signal are detected, and a spindle control is performed in accordance with detected control information. In order to realize a high precision spindle control, the control information is derived from the wobble signal by using a narrow band (high Q) band-pass filter BPF. If the center frequency of the wobble signal shifts to the outside of the band of BPF such as when a spindle starts rotating or during a search, no output is obtained from BPF. It is therefore necessary to control the spindle rotation at a high precision by using an external FG signal and pick position information until the center frequency of the wobble signal enters the band of BPF.

FIG. 3 is a block diagram showing the structure of a spindle circuit system for a conventional optical drive system. A reproduction signal is picked up from an optical disk 1 by a pickup 3. A wobble detector 4 detects a wobble signal from the reproduced signal. The detected wobble signal is supplied to a band-pass filter 5 to obtain information for the spindle control. A CLV controller 8 performs a constant linear velocity (CLV) control in accordance with the control information from the band-pass filter 5 and a standard clock from a standard clock generator 9.

A pick position detector 13 detects pickup position information from a reproduction signal picked up by the pickup 3. An FG detector 14 detects FG information from a spindle motor 2. A rotation detector or controller 15 receives the pick position information, FG information, and standard clock signal, and outputs a spindle control signal for the rotation control.

A selector 11 controlled by a micro-processor 12 selects a control signal from the rotation controller 15 until a predetermined linear velocity is obtained, and selects a control signal from the CLV controller 8 after the predetermined linear velocity is obtained. In accordance with a control signal outputted from the selector 11, the rotation of the spindle motor 2 is controlled.

A spindle control circuit of a conventional optical disk drive performs a spindle control in accordance with center frequency information of a wobble signal obtained by a band-pass filter. Therefore, the center frequency information cannot be obtained until a linear velocity reaches a predetermined value, causing a velocity off-control. In view of this, it is necessary to control the spindle rotation at a high precision by using other information such as FG information and pick position information until the center frequency of the wobble signal enters the band of the band-pass filter. As a result, a precision of an output of the band-pass filter cannot be improved more than an externally controllable precision, thereby limiting the control precision.

SUMMARY OF THE INVENTION

It is an object of the present invention to provide a spindle control circuit of an optical disk drive capable of performing a high precision and high stability spindle control by preventing an off-control even if the rotation speed is shifted from a predetermined linear velocity such as when a spindle starts rotating or during a search.

In order to solve the above problem, the invention provides a spindle control circuit of an optical disk drive for performing a constant linear velocity control in accordance with a wobble signal picked up from an optical disk, having: a first band-pass filter having a narrow pass band with a center frequency being set to the center frequency of the wobble signal; a second band-pass filter having a pass band broader than the first band-pass filter, with a center frequency being set to the center frequency of the wobble signal; lock detecting means for detecting a lock state that the wobble signal has a frequency in a predetermined range and outputting a lock signal; and selector means for selectively outputting an output of the second band-pass filter until the lock detecting means detects the lock state, and selectively outputting an output of the first band-pass filter after the lock state is detected, wherein the linear velocity speed control is performed in accordance with an output signal from the selector means.

According to the invention, the first and second band-pass filters are provided having a narrow band and a broad band, with the center frequency of the band being set to the center frequency of a wobble signal picked up from an optical disk. An output of the second band-pass is selectively outputted until a lock state is detected, and an output of the first band-pass filter is selectively outputted after the lock state is detected. A linear velocity control is performed in accordance with a selected output of the first and second band-pass filters.

BRIEF DESCRIPTION OF THE DRAWINGS

FIG. 2 is a graph showing the characteristics of band-pass filters 5A and 5B of the embodiment shown in FIG. 1 and a conventional band-pass filter.

DETAILED DESCRIPTION OF THE PREFERRED EMBODIMENTS

An embodiment of the invention will be described with reference to the accompanying drawings.

Figure 1:
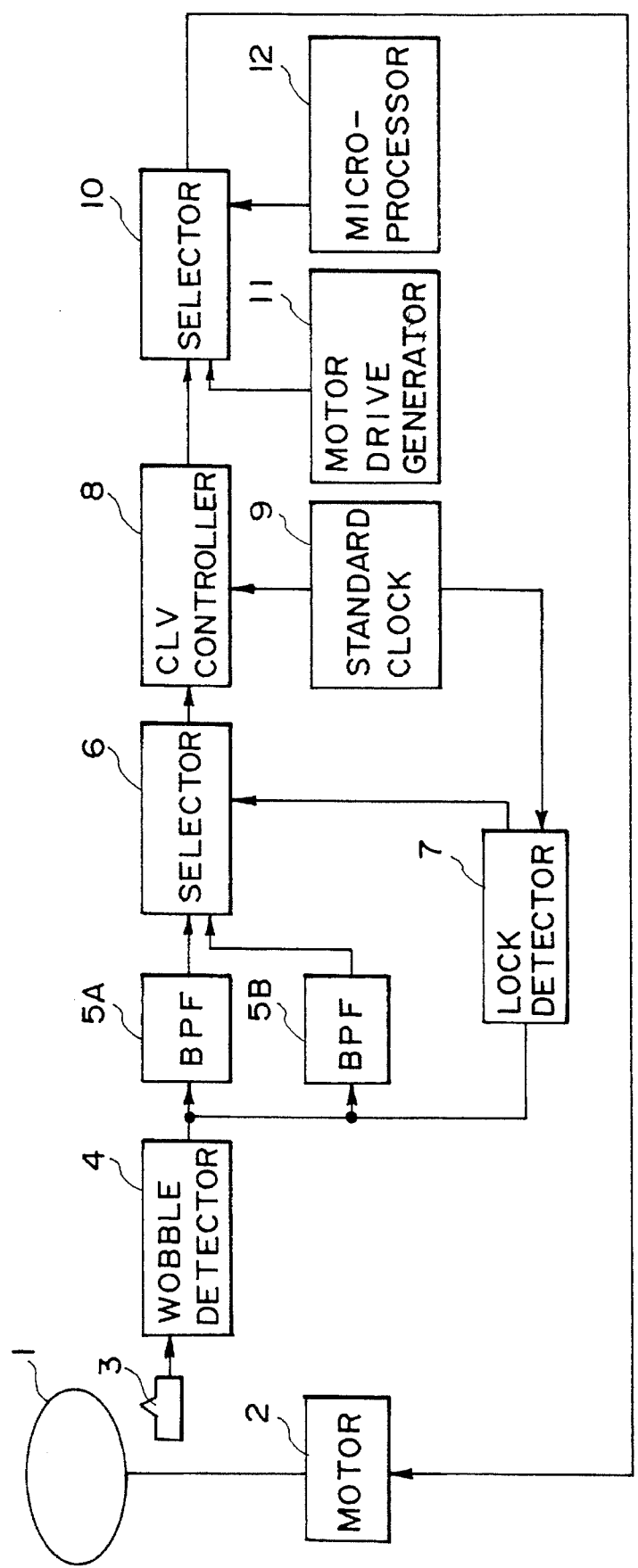
FIG. 1 is a block diagram showing the structure of an embodiment of a spindle control circuit of an optical disk drive according to the invention.
Figure 3:
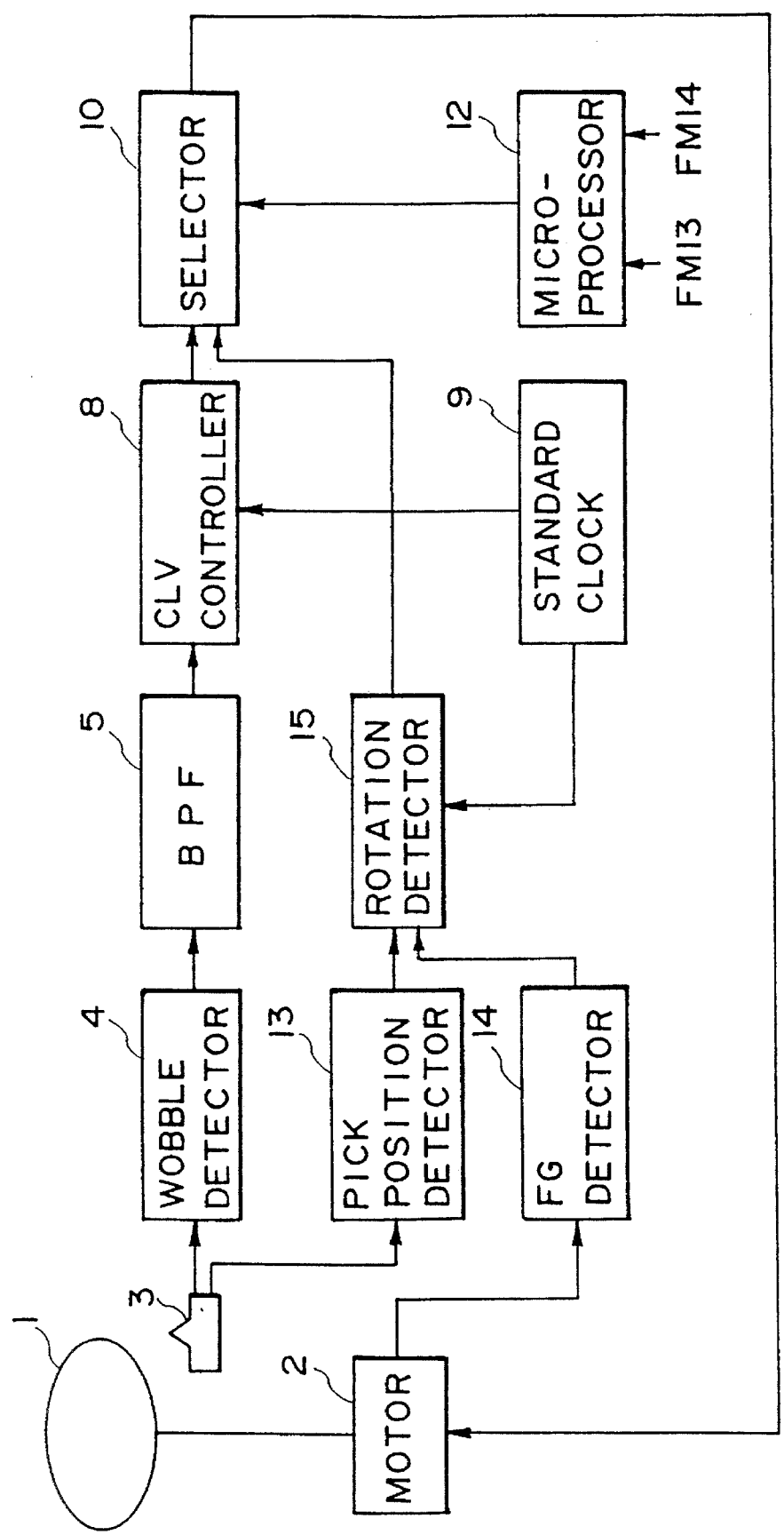
FIG. 3 is a block diagram showing the structure of a spindle circuit system of a conventional optical disk drive.

FIG. 1 is a block diagram showing the structure of an embodiment of a spindle control circuit of an optical disk drive according to the invention. In FIG. 1, like elements to those shown in FIG. 3 and represented by identical reference numerals have the same functions as the elements described with FIG. 3.

In this embodiment, a wobble signal obtained by a wobble signal detector 4 from a reproduction signal picked up by a pickup 3 from an optical disk 1 is supplied to band-pass filters 5A and 5B having a different bandwidth and to a lock detector 7. The bandwidth of each of the band-pass filters 5A and 5B is set to have the band-pass characteristics shown in FIG.2. The band-pass filter 5A has a narrow band (generally a bandwidth of ±1 kHz) at the center frequency of 22.05 kHz of the wobble signal so as to allow a high precision control not affected by noises and bi-phase modulation. The band-pass filter 5B has a broad band allowing the center frequency of the wobble signal to be detected at any position on an optical disk in the range of the rotation rate of 200 to 600 rpm of a spindle motor 2. Since the rotation rate at the highest is three times as fast as the lowest, it is desirable to set the lower limit to 7.35 kHz and the upper limit to 66.15 kHz. For reference, FIG. 2 shows an example of the band-pass characteristics of a conventional band-pass filer 5 (22.05 kHz ±6.3 kHz).

A lock detector 7 receives a standard clock signal from a standard clock generator 9, detects a lock state that the frequency of the wobble signal from the wobble signal detector 4 enters a predetermined range, and outputs a lock detection signal to a selector 6.

The selector 6 selects and outputs a signal from the band-pass filter 5B until the lock detection signal is outputted, and selects and outputs a signal from the band-pass filter 5A while the lock detection signal is outputted.

A CLV controller compares a clock signal of 22.05 kHz obtained by dividing the standard clock from the standard clock generator 9 with an output signal from the selector 6, and outputs a velocity error signal.

A selector 10 receives the velocity error signal from the CLV controller 8 and a motor drive signal from a motor drive signal generator 11, and outputs under the control of a micro-computer 12 a motor drive signal to a spindle motor 2 for the spindle drive. This motor drive signal is used for rotating the spindle motor 2 to the rotation rate necessary for obtaining an output of the band-pass filter 5B. When the necessary rotation rate is obtained, the selector 10 supplies an output signal from the CLV controller 8 to the spindle motor 2.

In the above embodiment, the motor drive signal generator 11 may be substituted by a constant voltage generator with resistor division or a port output of the micro-computer 12. A rotation controller using a motor FG may also be used.

The lock detector 7 may be substituted by an error flag output of a decoder for decoding ATIP data. The selector 10 may be controlled after a predetermined lapse under the control of the micro-computer 12.

As described so far, according to the spindle control circuit of an optical disk drive, a band-pass filter having a band width narrower than a conventional band-pass filter is used for the CLV control. Accordingly, not only a higher precision CLV control is possible, but also a pick position detector and the rotation control by motor FG are not needed and the structure can be simplified because the wobble frequency band capable of being locked in the CLV control becomes broad.

What is claimed is:

1. A spindle control circuit of an optical disk drive for performing a constant linear velocity control in accordance with a wobble signal picked up from an optical disk, comprising:

a first band-pass filter having a narrow pass band with a center frequency being set to the center frequency of the wobble signal;

a second band-pass filter having a pass band broader than said first band-pass filter, with a center frequency being set to the center frequency of the wobble signal;

lock detecting means for detecting a lock state that the wobble signal has a frequency in a predetermined range and outputting a lock signal; and selector means for selectively outputting an output of said second band-pass filter until said lock detecting means detects the lock state, and selectively outputting an output of said first band-pass filter after the lock state is detected, wherein the linear velocity control is performed in accordance with an output signal from said selector means.

* * * * *